(12) United States Patent
Shinohara et al.

(10) Patent No.: US 6,257,111 B1
(45) Date of Patent: *Jul. 10, 2001

(54) AUTOMATIC LATHE AND CONTROL METHOD THEREFOR

(75) Inventors: Hiroshi Shinohara; Takaichi Nakaya, both of Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/486,467

(22) PCT Filed: Apr. 7, 1998

(86) PCT No.: PCT/JP98/01594

§ 371 Date: Feb. 28, 2000

§ 102(e) Date: Feb. 28, 2000

(87) PCT Pub. No.: WO99/11409

PCT Pub. Date: Mar. 11, 1999

(51) Int. Cl.[7] ........................................ B23B 9/00
(52) U.S. Cl. .............. 82/120; 82/121; 82/118; 29/26 A
(58) Field of Search ............. 82/120, 121, 1.11, 82/118; 29/26 A, 567; 408/35

(56) References Cited

U.S. PATENT DOCUMENTS

| 3,760,472 | * | 9/1973 | Kielma et al. | 29/40 |
| 4,074,177 | * | 2/1978 | Olig | 29/26 A |
| 4,090,281 | * | 5/1978 | Hautau | 29/40 |
| 4,309,809 | * | 1/1982 | Yokoe et al. | 29/568 |
| 4,413,539 | * | 11/1983 | Ishizuka et al. | 82/2 R |
| 4,621,407 | * | 11/1986 | Suzuki | 29/568 |
| 4,649,610 | * | 3/1987 | Onishi et al. | 29/26 A |
| 4,709,455 | * | 12/1987 | D'Andrea et al. | 29/26 A |
| 5,084,951 | * | 2/1992 | Bonomi et al. | 29/26 A |
| 5,097,587 |   | 3/1992 | Yasuda | 29/568 |
| 5,514,061 | * | 5/1996 | Ito | 29/26 A |
| 5,842,392 | * | 12/1998 | Pfeifer et al. | 82/1.11 |

FOREIGN PATENT DOCUMENTS

| 2-284847 | 11/1990 | (JP) . |
| 3-19747 | 1/1991 | (JP) . |
| 3-136745 | 6/1991 | (JP) . |
| 5-96449 | 4/1993 | (JP) . |
| 7-39069 B2 | 5/1995 | (JP) . |

* cited by examiner

Primary Examiner—Henry Tsai
(74) Attorney, Agent, or Firm—Finnegan, Henderson, Farabow, Garrett & Dunner, L.L.P.

(57) ABSTRACT

A turret (24) is clamped on a tool rest body (22) by a pair of coupling elements (66, 68). During a rotational indexing operation for a tool selection, the tool rest body (22) and the turret (24) are moved relative to each other along a Z-axis, to disengage the coupling elements (66, 68) and thus unclamp the turret (24). At this time, the tool rest body (22) is moved relative to a lathe base (10) along the Z-axis, synchronously to the relative movement of the tool rest body (22) and the turret (24) along the Z-axis. The direction and distance of the motion of the tool rest body (22) relative to the lathe base (10) is adjusted so as to eliminate the relative movement between the turret (24) and a spindle stock (12). This motional control serves to prevent the turret (24) and a tool attached thereto from moving relative to the spindle stock (12) and a workpiece, whereby the problem of interference between these components can be solved.

7 Claims, 10 Drawing Sheets

AUTOMATIC LATHE AND CONTROL METHOD THEREFOR

TECHNICAL FIELD

The present invention relates to an automatically operated lathe provided with a turret-type tool rest for holding a plurality of tools attached thereto, the tool rest permitting a desired tool to be selected by an indexing rotation and to be located at an operative position. The present invention also relates to a method for controlling such an automatically operated lathe.

BACKGROUND ART

Recently, the demand for an automatically operated lathe, provided with a turret-type tool rest to which a plurality of tools can be attached, has increased in order to realize an automatic and high-speed processing or machining operation and to correspond to multi-item production of small quantities. It should be noted that, in this specification, the term "automatically operated lathe" means any lathe, such as an NC lathe, that can automatically perform a lathe turning process.

The turret-type tool rest is structured in such a manner as to rotate a turret mounted on a tool rest body so as to automatically index a plurality of (generally, five to twelve) indexed positions. The turret is provided at the outer circumferential surface or the axial end surface thereof with a plurality of tool-attachment portions corresponding to the indexed positions. various tools, such as a single point tool, a drill, etc., can be attached to each of the tool-attachment portions, and an appropriate tool which meets machining particulars can be automatically selected by the indexing rotation of the turret so as to be located at a predetermined operative position on the automatically operated lathe. It should be noted that, in this specification, the term "axial" means a direction along the rotational or central axis of an object.

In a condition where a selected tool performs a turning or drilling process on a workpiece, it is required to firmly fix the turret at a selected indexed position on the tool rest body. Accordingly, a pair of coupling elements which can be engaged with and disengaged from each other (or clamp/unclamp actions) are generally provided between the tool rest body and the turret. The engagement or disengagement of the pair of coupling elements makes the turret freely rotate in an indexing manner or locates and fixes the turret at a predetermined indexed position.

In general, as a coupling unit including the pair of coupling elements, a construction (referred to, for example, as a CURVIC coupling) has been used, wherein coupling elements having crown-gear shapes, each provided with a large number of teeth on an axial end surface, are engaged with each other.

Normally, in this type of coupling unit, one coupling element provided in a turret side is linearly shifted in an axial direction together with the turret, relative to another coupling element provided in a tool rest body side, so as to carry out the clamp/unclamp actions. Accordingly, in order to rotate the turret in an indexing manner, the turret is first moved in the axial direction relative to the tool rest body so as to release the interengagement of the coupling elements (an unclamp action), and the indexing rotation is performed in this state. Then, after the next tool is indexed, the turret is again moved in the axial direction so as to have the coupling elements interengaged (a clamp action), whereby the turret is fixedly held at the selected indexed position.

The indexing rotation of the turret is generally performed, after a machining step by a certain tool has been finished, so as to subsequently carry out a machining step by the other tool, as one step in the sequential steps of an automatic machining operation. To this end, during the indexing rotation, an unfinished workpiece and a spindle stock for supporting the workpiece are disposed near the turret.

Consequently, if the indexing rotation of the turret is performed while leaving the situation where the machining step by a certain tool has been finished, disadvantage may be caused wherein the turret or the tool attached to the turret interferes or collides with the spindle stock or the workpiece, due to the axial movement of the turret for releasing the coupling elements.

In order to solve the above problem, when the rotational indexing operation of the turret is incorporated into a processing or machining program, in a conventional automatically operated lathe, the machining program is written in such a way that the rotational indexing operation involving the clamp/unclamp actions is performed after the turret-type tool rest or the tool is shifted relative to the spindle stock or the workpiece into a location (a retreated position or a tool home position) where the interference due to the axial movement of the turret is avoidable, and that the turret-type tool rest is returned back to the operative position after the rotational indexing operation has been completed.

Incidentally, the machining program of the automatically operated lathe is generally written by a user in a manual operation so as to correspond to the types or the machining particulars of workpieces. The user normally writes the machining program which should be entered into the automatically operated lathe, while referring to the design drawings of a product.

However, the axial movement of the turret, accompanying the rotational indexing operation, is a movement resulted from the construction of the automatically operated lathe and, therefore, cannot be recognized from the design drawings of a product. Consequently, it has been troublesome for the user to make the machining program in such a manner as to always consider the above-described axial movement of the turret. Also, it is considered that an inappropriate machining program, which dose not take the axial movement of the turret accompanying the rotational indexing operation into consideration (i.e., which does not include the retreat and return movements of the turret-type tool rest), is carelessly built. If such inappropriate machining program is entered into the automatically operated lathe, there is a possibility in that the turret or the tool will interfere with the spindle stock or the workpiece to damage them during the rotational indexing operation.

In the case where the turret-type tool rest is operated for the above-described retreat and return movements whenever the turret is rotated in the indexing manner, the machining time is extended by at least a time spent for the retreat and return movements. In order to reduce the unnecessary extension of the machining time as much as possible, it is conceivable that the retreat and return movements of the turret-type tool rest is started simultaneously with the activation of the axial movement, i.e., the unclamp/clamp actions, of the turret, but, in this case, the problem of interference cannot be fully solved. Also, in the case where the mutual interference between the turret or the tool and the spindle stock or the workpiece does not occur even when the indexing rotation is performed, the retreat movement of the turret-type tool rest is regarded essentially as an unnecessary movement if the axial movement of the turret is not required.

DISCLOSURE OF THE INVENTION

An object of the present invention is to provide an automatically operated lathe which, in the case where a turret is moved in a direction along a rotation axis relative to a tool rest body so as to allow unclamp/clamp actions accompanying the indexing rotation of the turret, can surely prevent the mutual interference between the turret or a tool and a spindle stock or a workpiece without performing the retreat/return movements of a turret-type tool rest relative to the spindle stock holding the workpiece, and thereby can reduce a machining time and also can facilitate the work for writing a machining program by a user.

Another object of the present invention is to provide a method for controlling such an automatically operated lathe.

To accomplish the above objects, the present invention provides an automatically operated lathe, comprising a lathe base; a spindle stock placed on the lathe base; a tool rest body placed on the lathe base; a turret supported on the tool rest body, the turret being capable of performing an indexing rotation about a rotation axis on the tool rest body and a linear movement along the rotation axis in an indexed position; a pair of coupling elements provided between the tool rest body and the turret, the coupling elements being engaged with and disengaged from each other while accompanying the linear movement of the turret in the indexed position on the tool rest body; first drive means for generating a relative movement between the spindle stock and the tool rest body on the lathe base; second drive means for generating the indexing rotation and the linear movement between the tool rest body and the turret; and control means for controlling the first and second drive means in such a manner as to move the spindle stock and the tool rest body relative to each other, synchronously to the linear movement of the turret, and thereby preventing a relative movement between the turret and the spindle stock.

In order to operate the turret to perform the indexing rotation, it is required that the turret is linearly moved by the second drive means, and thereby the pair of coupling elements are disengaged from each other, at the indexed position on the tool rest body. In this connection, the first drive means generates the relative movement between the spindle stock and the tool rest body on the lathe base, synchronously to the linear movement of the turret. This relative movement is set to have a direction and a moving distance for preventing the relative movement between the turret and the spindle stock.

As a result, the relative movement between the turret or tool and the spindle stock or workpiece can be surely prevented. Also, when a user writes the machining program of the workpiece, it is not required, contrary to the prior art, to consider the relative linear movement between the workpiece and the turret caused while accompanying the indexing rotation of the turret, so that the program writing is facilitated. Further, before and after the indexing rotation of the turret, it is not required, contrary to the prior art, to make the turret and the tool rest body perform the retreat and return movement, so that the machining time can be reduced by a time required to the retreat and return movement. This is effective particularly in the case where the mutual interference is not caused between the turret or tool and the tool rest body or workpiece even in the indexing rotation.

In the above structure, an axis included in the spindle stock may be arranged in parallel to the rotation axis of the turret.

In this case, a structure may be adopted wherein the first drive means acts to move the tool rest body in a first coordinate-axis direction parallel to the rotation axis of the turret and in a second coordinate-axis direction orthogonal to the first coordinate-axis direction.

Also, an alternative structure may be adopted wherein the first drive means acts to move the spindle stock in a first coordinate-axis direction parallel to the rotation axis of the turret and to move the tool rest body in a second coordinate-axis direction orthogonal to the first coordinate-axis direction.

Further, in the above structure, an axis included in the spindle stock may be arranged orthogonally to the rotation axis of the turret.

In this case, a structure may be adopted wherein the first drive means acts to move the tool rest body in a first coordinate-axis direction parallel to the rotation axis of the turret and in a second coordinate-axis direction orthogonal to the first coordinate-axis direction.

The present invention further provides a method of controlling an automatically operated lathe which includes a lathe base; a spindle stock and a tool rest body, both being relatively movably placed on the lathe base; a turret supported on the tool rest body, the turret being capable of performing an indexing rotation about a rotation axis on the tool rest body and a linear movement along the rotation axis in an indexed position; and a pair of coupling elements provided between the tool rest body and the turret, the coupling elements being engaged with and disengaged from each other while accompanying with the linear movement of the turret in the indexed position on the tool rest body; the method comprising the steps of linearly moving the turret along the rotation axis in the indexed position; and moving the spindle stock and the tool rest body relative to each other, synchronously to the linear movement of the turret, and thereby eliminating a relative movement between the turret and the spindle stock.

BRIEF DESCRIPTION OF THE DRAWINGS

The above and other objects, features and advantages of the present invention will be described on the basis of the embodiments shown in the attached drawings, wherein.

BEST MODES FOR CARRYING OUT THE INVENTION

Figure 1:
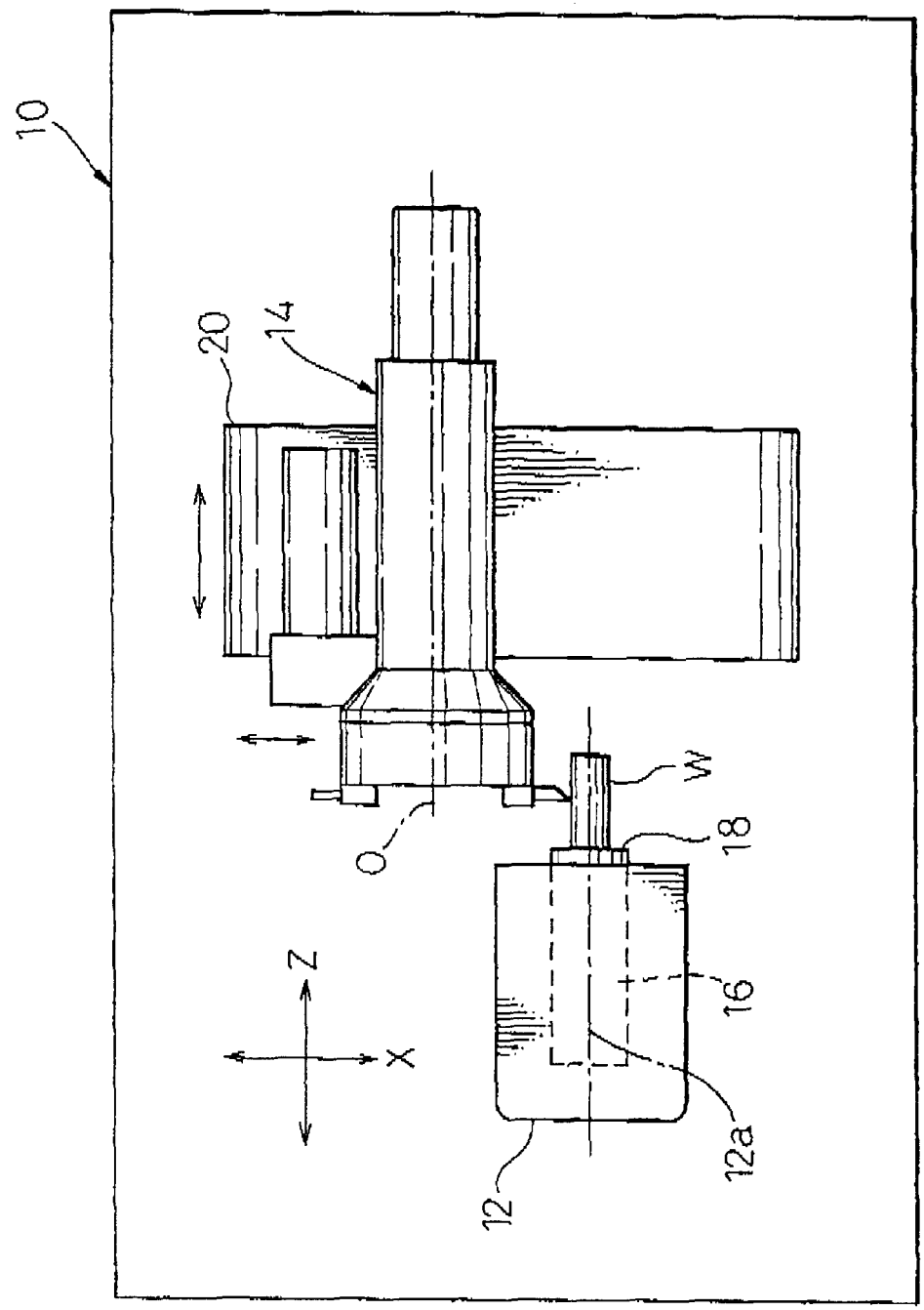
FIG. 1 is a schematic plan view showing the outside configuration of one embodiment of an automatically operated lathe according to the present invention.

With reference to the drawings, FIG. 1 shows in a schematic plan view the outside configuration of one embodiment of an automatically operated lathe according to the present invention. As shown in FIG. 1, the automatically operated lathe is provided with a lathe base 10, and a spindle stock 12 and a turret-type tool rest 14, both placed on the lathe base 10.

The spindle stock 12 contains therein a rotary spindle 16, a spindle motor (not shown) for driving the rotary spindle 16, etc., and a chuck 18 for fixedly holding a workpiece W is installed on the distal end of the rotary spindle 16. The rotary spindle 16 is driven to rotate by the spindle motor, and the workpiece W is thereby rotated about an axis 12a. In the illustrated embodiment, the spindle stock 12 is statically arranged on the lathe base 10, and the axis 12a is located in parallel to a Z-axis in a rectangular three-axis coordinate system given on the lathe base 10.

The turret-type tool rest 14 is fixedly mounted on a tool slide 20 placed on the lathe base 10. The tool slide 20 is translated by a not-shown drive mechanism in a Z-axis direction parallel to the axis 12a as described above and in an X-axis direction orthogonal to the axis 12a, in the rectangular three-axis coordinate system given on the lathe base 10. The turret-type tool rest 14 is thereby translated integrally with the tool slide 20 in the Z-axis direction and the X-axis direction, so that the workpiece W is turned or machined into a desired shape.

FIG. 2A shows the turret-type tool rest 14 in a sectional plan view. The turret-type tool rest 14 is provided with a tool rest body 22 fixedly supported on the tool slide 20, and a turret 24 rotatably and linearly movably supported on the tool rest body 22.

The turret 24 includes a cylindrical base section 24a with a small diameter, and a head section 24b with a large diameter, which extends in a radial direction integrally from the axial front end (left end in the drawing) portion of the base section 24a. A plurality of tool-attachment portions 26 are provided in an outer circumferential region of the head section 24b of the turret 24 at every predetermined indexed angle about the rotation axis O of the turret 24. A cutting tool 30 such as a single point tool fitted to a tool holder 28 (see FIG. 2B) and a rotary tool 34 such as a drill fitted to another tool holder 32 can be attached to the tool-attachment portions 26 through the tool holders 28, 32.

As shown in FIG. 2B, the tool holder 28 for the cutting tool 30 is located at a desired indexed-angle position by inserting a protrusion 28a formed on one side of the tool holder into an attachment hole 26a formed in the desired tool-attachment portion 26 on the turret 24, and is firmly fixed to this tool-attachment portion 26 by a not-shown fastener such as a bolt.

Also, the tool holder 32 for the rotary tool 34 is located at a desired indexed-angle position by inserting a protrusion 32a formed on one side of the tool holder into an attachment hole 26a formed in the other desired tool-attachment portion 26 on the turret 24, and is firmly fixed to this tool-attachment portion 26 by a not-shown fastener such as a bolt.

The tool holder 32 further contains therein a tool rotating shaft 36 rotatably extending through the center of the protrusion 32a and a power transmission mechanism (not shown) interlocking with the tool rotating shaft 36, and a tool chuck 38 for holding the rotary tool 34 is provided at the end of the power transmission mechanism. A tool rotating gear 40 is secured to the distal end of the tool rotating shaft 36 projecting from the protrusion 32a.

The attachment hole 26a of each tool-attachment portion 26 is formed so as to axially penetrate through the large-diameter head section 24b of the turret 24. Accordingly, when the tool holder 32 is properly attached to the desired tool-attachment portion 26, the tool rotating gear 40 secured to the tool rotating shaft 36 is disposed to project from the rear end face (right end face in the drawing) of the head section 24b of the turret 24.

The attachment structure of the tool-attachment portions 26 and various tools in the turret 24 is not limited to the above-described constitution, and thus can adopt any other type of attachment structures of the tool-attachment portions and various tools, generally used in the turret of a machining tool.

The small-diameter base section 24a of the turret 24 is slidably received into a cylindrical sliding bearing 42 formed in the bore 22a of the tool rest body 22. The turret 24 is thereby attached to the tool rest body 22 while allowing a free indexing rotation about the rotation axis O and a free linear movement along the rotation axis O. The rotation axis O extends in the Z-axis direction parallel to the axis 12a.

A ball screw 44 is rotatably installed in the bore 22a of the tool rest body 22 through an antifriction bearing 46 and coaxially to the turret 24 in relation to the rotation axis O. A power transmission gear 48 is secured to the proximal end of the ball screw 44.

A coupling drive motor 50 (hereinafter referred simply to as a coupling motor 50) structured from a servo motor is mounted on the tool rest body 22. Although not shown, a drive gear operatively joined to the power transmission gear 48 is fitted to the rotary shaft of the coupling motor 50. The rotational drive force of the coupling motor 50 is transmitted through this drive gear and the power transmission gear 48 to the ball screw 44, and thereby the ball screw 44 is driven to rotate.

A nut 52 is screwed onto the ball screw 44, and is secured to the base section 24a of the turret 24. Consequently, the nut 52 is linearly shifted along the rotation axis O following the rotation of the ball screw 44, and the turret 24 is linearly moved along the rotation axis O (i.e., in the Z-axis direction) integrally with the nut 52. The ball screw 44 and the nut 52 thus constitute a feed screw mechanism for linearly moving the turret 24.

An annular space is defined between the front end is (left end in the drawing) face 22b of the tool rest body 22 and the rear end face of the head section 24b of the turret 24. An annular bearing-attachment member 56, a bearing 58 and an annular gear 60 are placed in this space, coaxially with the turret 24 in relation to the rotation axis O.

Figure 3:
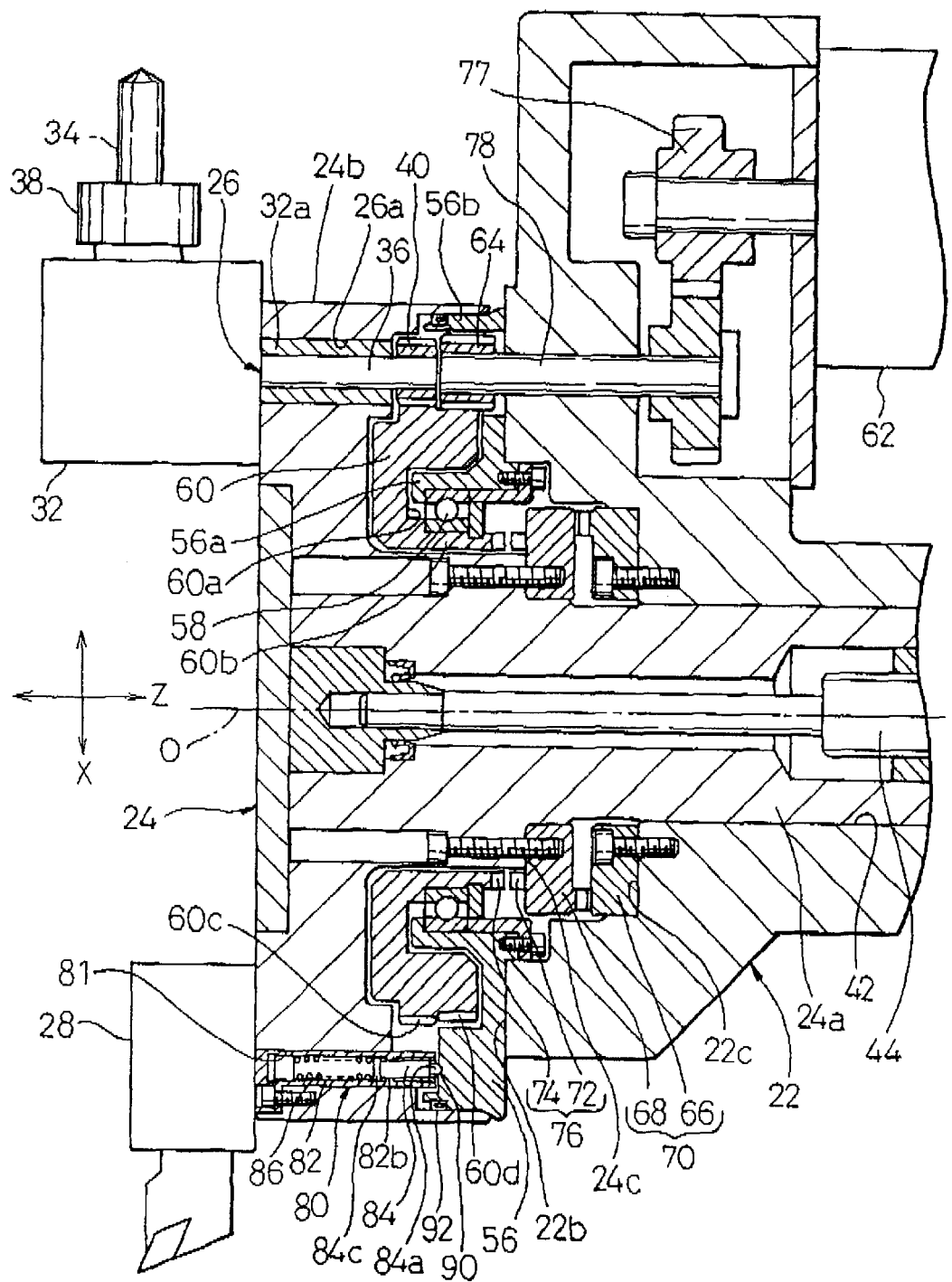
FIG. 3 is an enlarged sectional view showing the turret-type tool rest of FIG. 2A, in a completely clamped position where coupling elements are mutually engaged and clutch pieces are mutually disengaged.

As shown in FIG. 3 in an enlarged manner, the bearing-attachment member 56 includes a cylindrical sleeve portion 56a surrounding the base section 24a of the turret 24 without being contact therewith and a flange portion 56b integrally extending from the sleeve portion 56a in a radial direction, and is closely attached and secured through the flange portion 56b to the front end face 22b of the tool rest body 22 by a not-shown securing means such as a bolt.

The bearing 58 is formed from, e.g., a deep groove bearing, and the outer ring thereof is fixedly fitted onto the inner circumferential surface of the sleeve portion 56a of the bearing-attachment member 56.

The annular gear 60 is disposed between the bearing-attachment member 56 and the head section 24b of the turret 24 without being contact therewith, and surrounds the base section 24b of the turret 24 without being in contact therewith. The annular gear 60 is provided on the rear end (right end in the drawing) face thereof with an annular recess 60a, and the sleeve portion 56a of the bearing-attachment member 56 and the bearing 58 are inserted into the recess 60a. The inner ring of the bearing 58 is fixedly fitted onto the outer circumferential surface of an inner circumferential wall 60b defining the recess 60a in the rear end face of the annular gear 60.

In this manner, the annular gear 60 is installed onto the tool rest body 22 in a rotatable and axially immovable manner through the bearing 58 and the bearing-attachment member 56. The annular gear 60 is provided on the outer circumferential surface thereof with a large number of teeth 60c engageable with the tool rotating gear 40 secured to the tool rotating shaft 36 of the tool holder 32 for the rotary tool 34 described above. The annular gear 60 is also provided on the outer circumferential surface thereof with a large number of teeth 60d arranged axially side-by-side with the teeth 60c, which are engageable with a gear 64 for transmitting a driving force of an indexing motor 62 described later.

The bore 22a of the tool rest body 22 includes a stepped portion 22c formed with an annular shape on the inner circumferential surface of the tool rest body 22, and has a larger diameter in the axially front end (left end in the drawing) side of the stepped portion 22c. An annular coupling element 66 provided for the tool rest body is secured to the front surface of the stepped portion 22c of the tool rest body 22. Also, the base section 24a of the turret 24 includes a stepped portion 24c formed with an annular shape on the outer circumferential surface thereof, and has a somewhat larger diameter in the front end or head section 24b side of the stepped portion 24c. An annular coupling element 68 provided for the turret is secured to the rear surface of the stepped portion 24c of the turret base section 24a. In this manner, the tool rest body-side coupling element 66 is arranged so as to be axially opposed to the turret-side coupling element 68.

Figure 4:
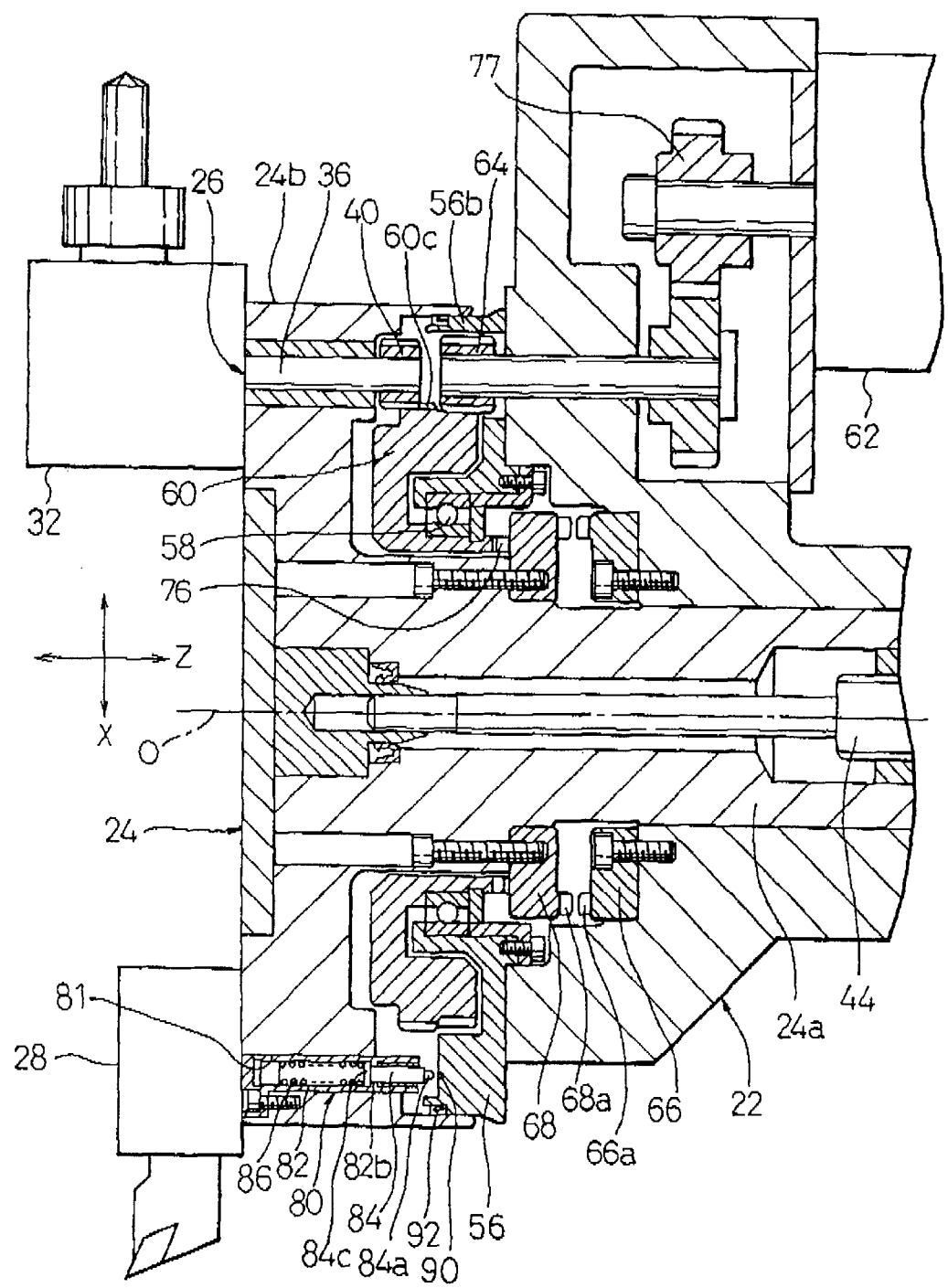
FIG. 4 is an enlarged sectional view showing the turret-type tool rest of FIG. 2A, in a completely unclamped position where coupling elements are mutually disengaged and clutch pieces are mutually engaged.

Both of the coupling elements 66, 68 have crown-gear structures, and are provided on respective one axial end faces opposed to each other with a large number of teeth 66a, 68a engageable with each other (see FIG. 4). Accordingly, the coupling elements 66, 68 constitute a coupling unit 70 in which they are engaged with and disengaged from each other (i.e., clamp/unclamp actions) while accompanying the axial linear movement of the turret 24. The coupling unit 70 having such a structure is similar in construction to one referred to as, e.g., a CURVIC coupling.

Figure 5A:
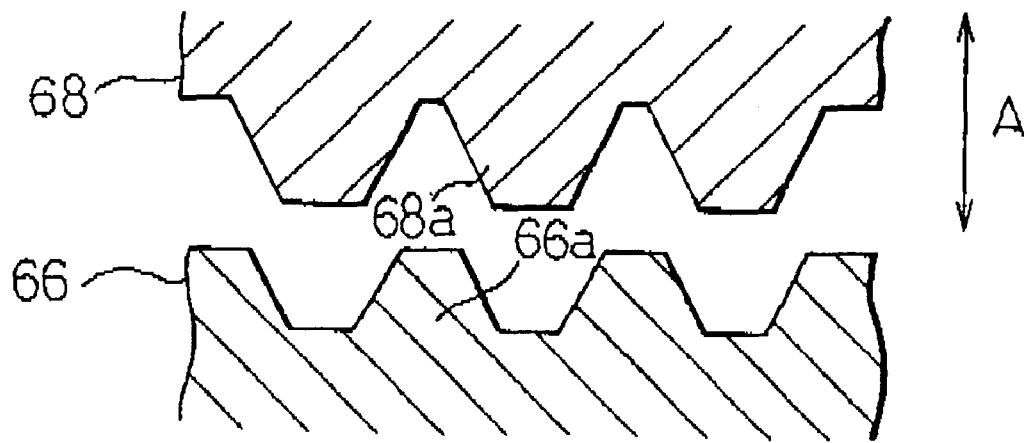
FIG. 5A is an enlarged sectional view showing the tooth configuration of a pair of coupling elements in the completely unclamped position.
Figure 5B:
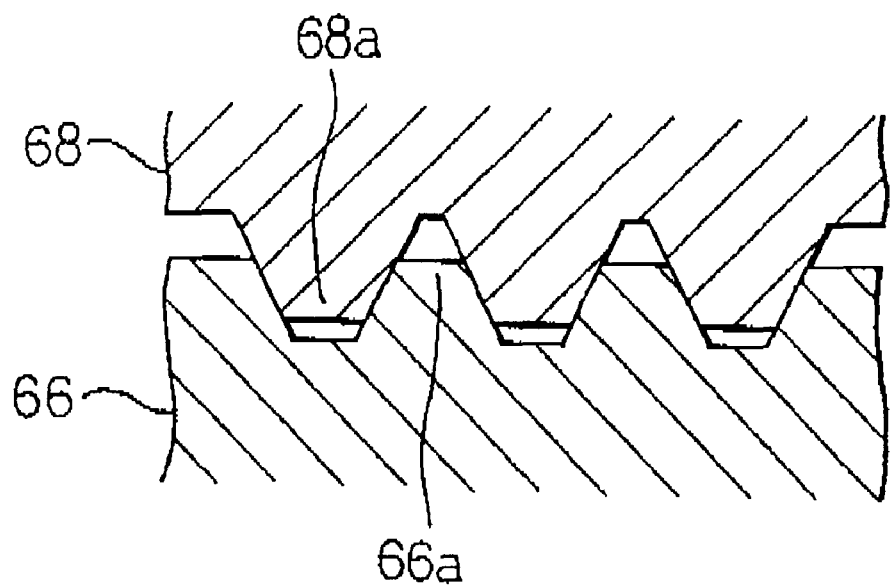
FIG. 5B is an enlarged sectional view showing the tooth configuration of the pair of coupling elements in the completely clamped position.

The large number of teeth 66a, 68a of the coupling elements 66, 68 are formed respectively with a regular pitch identical to each other, and each of which includes slanted lateral faces, as schematically shown in FIGS. 5A and 5B. In this arrangement, the turret-side coupling element 68 fixed to the turret 24 is shifted in a direction shown by an arrow A while accompanying the axial linear movement of the turret 24 along the rotation axis O, so that the teeth 66a of the tool rest body-side coupling elements 66 are engaged with or disengaged from the opposed teeth 68a of the turret-side coupling elements 68.

The turret-side coupling element 68 is also provided integrally on the axial front end surface thereof, opposite to the large number of teeth 68a, with a clutch piece 72 including a large number of teeth in a crown-gear shape (see FIG. 3). On the other hand, the above-described annular gear 60 is provided on the rear end of the inner circumferential surface 60b thereof with a clutch piece 74 also including a large number of teeth in a crown-gear shape (see FIG. 3). The clutch piece 72 provided on the turret-side coupling element 68 and the clutch piece 74 provided on the annular gear 60 are arranged so as to be axially opposed to each other, and constitute a clutch unit 76 in which they are engaged with and disengaged from each other while accompanying the axial linear movement of the turret 24.

The large number of teeth of the clutch pieces 72, 74 are formed respectively with a regular pitch identical to each other, and each of which includes slanted lateral faces, in the generally same manner as the above-described teeth 66a, 68a of the coupling elements 66, 68. In this arrangement, due to the shift of the turret-side coupling element 68 accompanying the axial linear movement of the turret 24 along the rotation axis O, the large number of teeth of the opposed clutch pieces 72, 74 are engaged with or disengaged from each other.

As is apparent from the above, the coupling unit 70 and the clutch unit 76 are constituted in such a manner that one of them is in an engaged condition while the other is in a disengaged condition. That is, in the condition shown in FIGS. 2A and 3, the tool rest body-side coupling element 66 is engaged with the turret-side coupling element 68 in the coupling unit 70, while the clutch pieces 72, 74 in the clutch unit 76 are mutually disengaged. On the other hand, in the condition shown in FIG. 4, the coupling elements 66, 68 in the coupling unit 70 are mutually disengaged, while the clutch pieces 72, 74 in the clutch unit 76 are mutually engaged.

FIG. 3 is an enlarged view of the turret-type tool rest 14 of FIG. 2A, and shows it in a completely clamped position where the coupling elements 66, 68 of the coupling unit 70 are mutually engaged to impede the rotation of the turret 24 about the rotation axis O. In the completely clamped position, a desired tool attached to the turret 24 is located at an operative position making it possible to machine a workpiece W (FIG. 2A), and the turret 24 is firmly and fixedly held in this state due to an interengagement between the coupling elements 66, 68. The completely clamped position, i.e., the interengaged condition between the coupling elements 66, 68, is maintained by a low output of the coupling motor 50.

The above-described indexing motor 62 structured from a servo motor different from the coupling motor 50 is mounted on the tool rest body 22. The rotary shaft of the indexing motor 62 is operatively connected via a gear train 77 to a shaft 78 extending through the tool rest body 22 and the bearing-attachment member 56, and the above-described gear 64 is fixed to the distal end of the shaft 78. Consequently, as described above, the driving force of the indexing motor 62 is transmitted through the gear train 77, the shaft 78 and the gear 64 to the annular gear 60, so that the annular gear 60 is driven to rotate.

In the completely clamped position of FIG. 3, the clutch pieces 72, 74 of the clutch unit 76 are disengaged from each other and, therefore, the driving force of the indexing motor 62 is not transmitted from the annular gear 60 to the turret 24. On the other hand, when the tool holder 32 for the rotary tool 34 is attached to the tool attachment portion 26 of the turret 24, the annular gear 60 is engaged with the tool rotating gear 40 fixed to the tool rotating shaft 36 of the tool holder 32, as already described. Accordingly, in the case where the rotary tool 34 is selected for machining the workpiece, the indexing motor 62 rotates the tool rotating shaft 36 through the annular gear 60, in the completely clamped position of FIG. 3, and thus drives to rotate the rotary tool 34.

From the condition shown in FIG. 3, when the ball screw 44 is driven to rotate by the coupling motor 50 and thereby the nut 52 and the turret 24 are linearly moved frontward (leftward in the drawing) along the rotation axis O, the relative movement in the Z-axis direction is caused between the tool rest body 22 and the turret 24, whereby the coupling elements 66, 68 of the coupling unit 70 are disengaged from each other. Then, immediately after the coupling unit 70 is completely disengaged, the clutch pieces 72, 74 of the clutch unit 76 come into engagement with each other.

FIG. 4 is an enlarged view of the turret-type tool rest 14 of FIG. 2A, and shows it in a completely unclamped position where the clutch pieces 72, 74 of the clutch unit 76 are mutually engaged. In the completely unclamped position, the coupling unit 70 is in the disengaged state, and the driving force of the indexing motor 62 is transmitted from the annular gear 60 through the clutch unit 76 to the turret 24. Consequently, the indexing motor 62 drives to rotate the turret 24 in the completely unclamped position of FIG. 4.

As described above, the turret-type tool rest 14 is structured in such a manner that the engagement of the clutch unit 76 is completed immediately after the coupling unit 70 is completely disengaged (the unclamping is completed), and that the engagement of the coupling unit 70 is completed immediately after the clutch unit 76 is completely disengaged (the clamping is completed).

Referring again to FIGS. 5A and 5B, when the coupling elements 66, 68 are mutually engaged, it will be appreciated that, until the completely clamped position shown in FIG. 5B is obtained where the slanted lateral faces of the opposed teeth 66a, 68a come into close contact with each other, the coupling elements 66, 68 can cause a displacement or a positional misalignment in a rotating direction therebetween due to gaps inevitably defined between the lateral faces of the opposed teeth 66a, 68a. This positional misalignment can also be caused after the coupling elements 66, 68 are mutually disengaged from the completely clamped position and until the completely unclamped position shown in FIG. 4 is obtained where the slanted lateral faces of the opposed teeth of the clutch pieces 72, 74 of the clutch unit 76 come into close contact with each other.

The positional misalignment in the rotating direction of the coupling elements 66, 68 is liable to occur in the case where the turret 24 has an unbalanced weight about the rotation axis O, such as the case where tools are attached to the tool-attachment portions 26 of the turret 24 with a locational unbalance. If such a positional misalignment occurs whenever the coupling unit 70 performs an engagement or disengagement action, it is apprehended that the large number of teeth 66a, 68a of the coupling elements 66, 68 may be worn and damaged due to the sliding or collision therebetween. The coupling elements 66, 68 are components required to have a high-precision positioning function so as to precisely perform a rotational indexing operation and, therefore, it is desired to prevent such a positional misalignment in the rotating direction as much as possible.

To this end, the turret-type tool rest 14 is provided with rotation suppressing means for suppressing the free rotation of the turret 24 about the rotation axis O until the coupling unit 70 and the clutch unit 76 reach the completely clamped position and the completely unclamped position.

Figure 6:
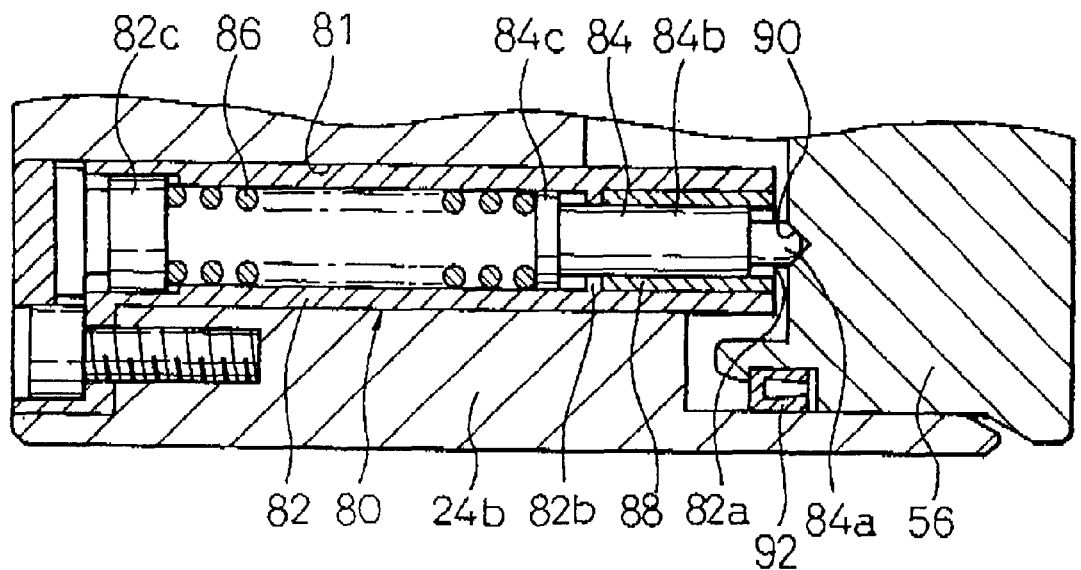
FIG. 6 is an enlarged partial sectional view showing a rotation suppressing means of the turret-type tool rest in the completely clamped position shown in FIG. 3.

As shown in FIGS. 2A to 4, the rotation suppressing means includes a spring-loaded plunger unit 80 installed at a desired position separately from the tool-attachment portions 26 in the outer circumferential region of the head section 24b of the turret 24. As shown in FIG. 6 in an enlarged manner, the spring-loaded plunger unit 80 includes a sleeve 82 secured in a receptive hole 81 formed to axially penetrate through the turret head section 24b separately from the attachment hole 26a of the tool-attachment portion 26, a plunger 84 supported in the sleeve 82 in an axially slidable manner, and a spring 86 for biasing the plunger 84 in a direction for making the distal end 84a thereof project from the end opening 82a of the sleeve 82.

The end opening 82a of the sleeve 82 is disposed so as to project from the rear end face of the head section 24b of the turret 24. The sleeve 82 is provided on the inner circumferential surface thereof with a protuberance 82b protruding radially inward at a position of an axially predetermined distance from the end opening 82a. The other end of the sleeve 82 is closed by a lid 82c, and the spring 86 is accommodated between the protuberance 82b and the lid 82c.

The plunger 84 includes a cylindrical body 84b, a distal end 84a axially extending from the body 84b and having an outer spherical surface, and a proximal end 84c radially extending from the body 84b as a flange. The proximal end 84c of the plunger 84 is disposed between the protuberance 82b and the lid 82c of the sleeve 82 so as to receive the biasing force of the spring 86.

The plunger 84 can be axially displaced without collision on the body 84b with the protuberance 82b of the sleeve 82, and the axial displacement is stopped by the collision on the proximal end 84c with the protuberance 82b at a predetermined axial position. In order to permit the plunger 84 to be accurately displaced in the axial direction, a sliding bearing element 88 for slidably supporting the body 84b of the plunger 84 is placed between the end opening 82a and the protuberance 82b of the sleeve 82.

On the other hand, the bearing-attachment member 56 secured to the axial front end face 22b of the tool rest body 22 is provided on the axial front end face thereof with a countersink 90 which can receive the distal end 84a of the plunger 84 of the spring-loaded plunger unit 80. The countersink 90 is one component of the rotation suppressing means, and is formed on the axial front end face of the bearing-attachment member 56 at each of indexed angles identical to the indexed angles of the turret 24. Accordingly, when the turret 24 is located in a desired rotationally indexed position, the distal end 84a of the plunger 84 is axially aligned with the desired countersink 90.

The mode of operation of the rotation suppressing means having the above-described structure will be described below. First, in the completely clamped position of FIGS. 3 and 5B, the turret 24 is located in a desired rotationally indexed position, and the distal end 84a of the plunger 84 of the spring-loaded plunger unit 80 is fixedly received in the desired countersink 90 of the bearing-attachment member 56. In this position, the plunger 84 is pushed against the biasing force of the spring 86 into a location where the proximal end 84c is spaced by a predetermined distance from the protuberance 82b of the sleeve 82.

When the turret 24 starts to be moved along the rotation axis O in the Z-axis direction from the completely clamped position, the coupling elements 66, 68 of the coupling unit 70 begin to be disengaged from each other, and thereby gaps are defined between the slanted lateral faces of the opposed teeth 66a, 68a. In this situation, the plunger 84 of the spring-loaded plunger unit 80 is axially displaced along the sleeve 82 by the biasing action of the spring 86 until the proximal end 84c collides with the protuberance 82b of the sleeve 82, so that the distal end 84a of the plunger 84 is kept in such a state as to be fixedly received in the countersink 90. Consequently, the free rotation of the turret 24 is suppressed, and thereby the positional misalignment in the rotational direction of the coupling elements 66, 68 as well as the positional misalignment in the rotational direction of the clutch pieces 72, 74 of the clutch unit 76 are prevented.

The distal end 84a of the plunger 84 is thus continued to be received in the countersink 90 until the proximal end 84c is shifted from the pushed-in location in the completely clamped position of FIG. 3 and collides with the protuberance 82b of the sleeve 82. During this operation, the turret 24 is axially moved from the completely clamped position of FIG. 3 to a state just before the completely unclamped position of FIG. 4, i.e., a state just before the opposed teeth of the clutch pieces 72, 74 of the clutch unit 76 come into close contact at their slanted lateral faces with each other. As a result, until the coupling unit 70 reaches a substantially completely disengaged state, the free rotation of the turret 24 is suppressed, and thereby the positional misalignment in the rotational direction of the coupling elements 66, 68 as well as the positional misalignment in the rotational direction of the clutch pieces 72, 74 are prevented.

When the turret 24 is moved further in the axial direction, the plunger 84 is displaced together with the sleeve 82 while following the turret 24, and the distal end 84a of the plunger 84 is disengaged from the countersink 90. At the instant when the distal end 84a of the plunger 84 is displaced so as to be slightly separated from the axial front end face of the bearing-attachment member 56, the opposed teeth of the clutch pieces 72, 74 of the clutch unit 76 come into close contact at their slanted lateral faces with each other, and the turret 24 reaches the completely unclamped position of FIGS. 4 and 5A.

In this manner, during the period when the turret 24 is moved from the completely clamped position and substantially reaches the completely unclamped position, the free rotation of the turret 24 is suppressed by the rotation suppressing means, and the positional misalignment in the rotational direction of the coupling elements 66, 68 as well as the positional misalignment in the rotational direction of the clutch pieces 72, 74 are prevented. As a result, the teeth of the coupling elements 66, 68 as well as of the clutch pieces 72, 74 can be effectively prevented from being worn and damaged.

The above operative effect of the rotation suppressing means can also be obtained during the period of movement of the turret 24 from the completely unclamped position to the completely clamped position in substantially the same way. In this case, however, there is a possibility in that the turret 24 slightly and freely rotates by an angle corresponding to the gap between the opposed teeth of the clutch pieces 72, 74, during a short period from an instant when the clutch pieces 72, 74 of the clutch unit 76 start to be disengaged from each other to an instant when the distal end of the plunger 84 is fitted into the countersink 90. In this occasion, the resulted slight positional misalignment in the rotational direction is corrected by fitting the distal end of the plunger 84 into the countersink 90 and, consequently, the coupling elements 66, 68 are accurately engaged with each other.

As will be understood from the above description, even when using the rotation suppressing means, the condition where the turret 24 is allowed to slightly and freely rotate occurs during the axial movement of the turret 24 over very short distance and period from an instant when the distal end 84a of the plunger 84 of the spring-loaded plunger unit 80 starts to be disengaged from the countersink 90 to an instant when the completely unclamped position is reached. However, such a free rotation capable of occurring in the very short period can be decreased as much as possible by a friction force exerted from a seal member 92 which is placed between the head section 24b of the turret 24 and the bearing-attachment member 56 fixed to the tool rest body 22 for preventing a dust penetration.

It is possible to modify and change the turret-type tool rest 14 having the above-described structure in various way within the scope of the present invention. For example, the feed screw mechanism constituted from the ball screw 44 and the nut 52 may be modified into such an arrangement that the nut 52 is in a driving part and the ball screw 44 is in a driven part, contrary to the above-described structure. In this arrangement, the ball screw 44 is secured to the turret 24, and the nut 52 formed so as to be axially immovable and only rotatable is connected to the coupling motor 50. The ball screw 44 is linearly shifted by the rotation of the nut 52, and the turret 24 is moved together with the ball screw 44 along the rotation axis O.

Also, if a low-friction structure or a feed precision is not required for the feed screw mechanism, a normal screw may be used for the ball screw 44. In this case, the above-described rotation suppressing means also effectively function in order to prevent the turret 24 in the driven part from rotating due to the torque of the coupling motor 50.

Further, the other construction for the coupling unit 70, such as a construction referred to, e.g., as a HIRTH coupling, may be utilized for the above-described construction referred to as a CURVIC coupling. A friction coupling (or a brake) with a sufficient braking force or a positioning mechanism using a shot pin may also be adopted in place of the coupling elements 66, 68.

Figure 7:
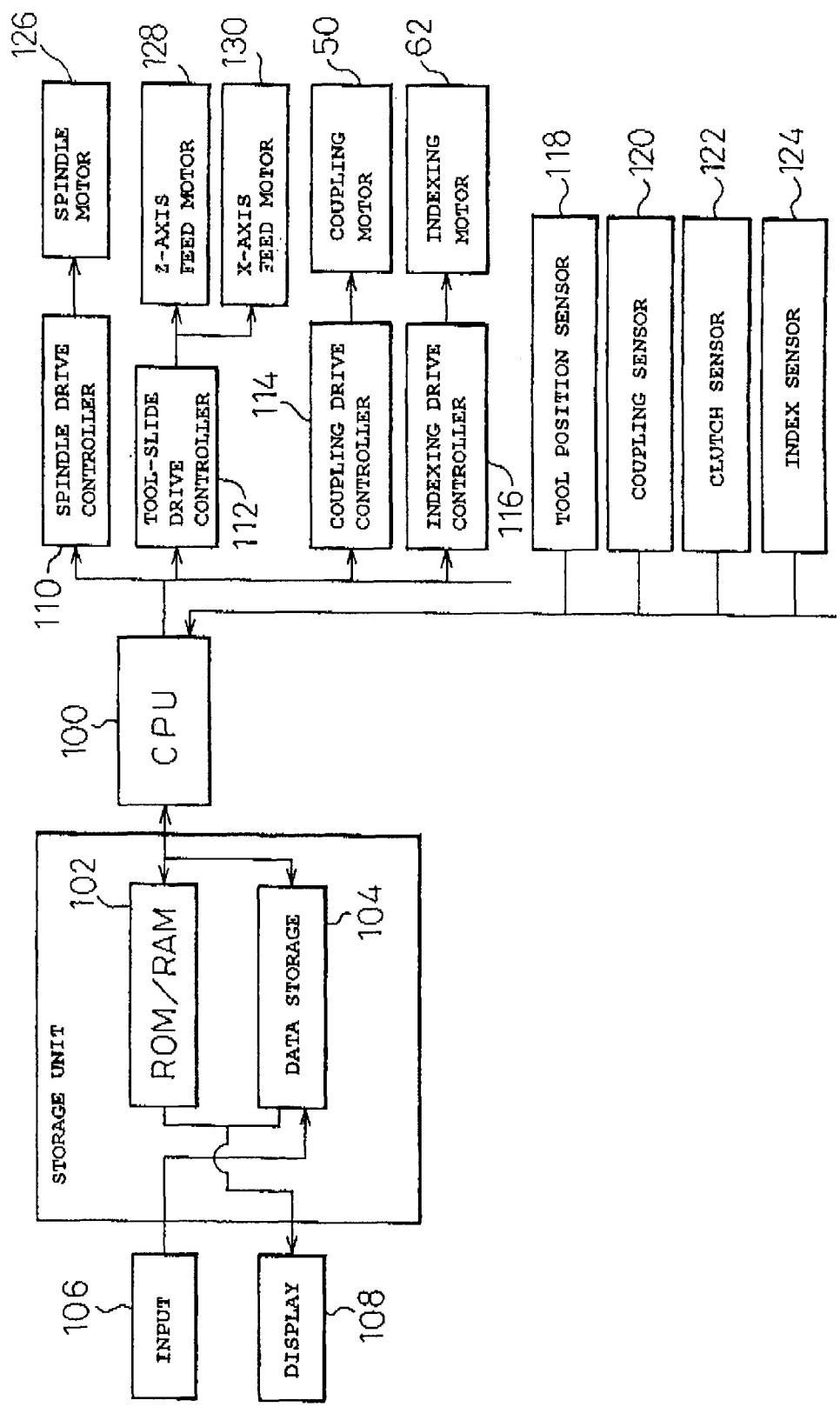
FIG. 7 is a block diagram showing the control system of a spindle stock, a tool slide and the turret-type tool rest.

FIG. 7 shows in a block diagram the control system of the spindle stock 12, the turret-type tool rest 14 and the tool slide 20 in the automatically operated lathe according to the above-described embodiment.

As shown in FIG. 7, the control system of the spindle stock 12, the turret-type tool rest 14 and the tool slide 20 includes a central processing unit (CPU) 100, a ROM/RAM 102, a data storage section 104, an input section 106, a display section 108, a spindle drive controller 110, a tool-slide drive controller 112, a coupling drive controller 114, an indexing drive controller 116, a tool position detecting sensor 118, a coupling sensor 120, a clutch sensor 122, an index sensor 124, and so on, A control program for driving the spindle stock 12, the turret-type tool rest 14 and the tool slide 20 is previously stored in the ROM/RAM 102. The CPU 100 controls, on the basis of this control program, the movement of each component of the spindle stock 12, the turret-type tool rest 14 and the tool slide 20. The input section 106 is formed from, e.g., a keyboard, and data (the selection of a tool, the shape and size of a machined article, the rotational frequency of a spindle, the feed speed of a tool, etc.) required for controlling the movement of each component of the spindle stock 12, the turret-type tool rest 14 and the tool slide 20 are entered through the input section 106. These data may be input by writing, e.g., numerical values in a drawing displayed on the display section 108 as an interactive mode. In this case, the above-described control system constitutes an NC (numerical control) unit.

Various data required for the drive control of the spindle stock 12, the turret-type tool rest 14 and the tool slide 20, involving the data entered through the input section 106, are stored in the data storage section 104.

The CPU 100 outputs a certain command on the basis of the control program in the ROM/RAM 102 as well as a tool selection (or turret index-rotation) data, a machining data, etc. stored in the data storage section 104.

The spindle drive controller 110 actuates a spindle motor 126, on the basis of the command of the CPU 100, so as to rotate the workpiece W held in the chuck 18 of the rotary spindle 16 on the spindle stock 12 about the rotation axis 12a (FIG. 1). The tool slide 20, on which the turret-type tool rest 14 is fixedly mounted, is moved in the Z-axis direction and the X-axis direction, so that the workpiece W is machined into a desired shape by the cutting tool 30 attached to the turret-type tool rest 14 and, if necessary, the rotary tool 34 driven by the indexing motor 62.

The tool-slide drive controller 112 actuates a Z-axis feed motor 128 and an X-axis feed motor 130, on the basis of the command of the CPU 100, so as to translate the tool slide 20 in the respective directions along an Z-axis and an X-axis On the lathe base 10. The Z-axis feed motor 128 and the X-axis feed motor 130 are means for generating a relative movement between the spindle stock 12 and the tool rest body 22 of the turret-type tool rest 14 on the lathe base 10, and thus constitute first drive means in the present invention.

The coupling drive controller 114 actuates the coupling motor 50, on the basis of the command of the CPU 100, so as to engage/disengage the coupling elements 66, 68 of the coupling unit 70 used for fixedly locating the turret 24 at a desired indexed position on the tool rest body 22, and to engage/disengage the clutch pieces 72, 74 of the clutch unit 76 used for operatively connecting the turret 24 with the indexing motor 62.

The indexing drive controller 116 actuates the indexing motor 62, on the basis of the command of the CPU 100, so as to perform the indexing rotation for the turret 24 or the rotation drive for the rotary tool 34. In this regard, the rotation drive for the rotary tool 34 is performed in connection with the machining of the workpiece W, while the indexing rotation for the turret 24 is performed in connection with a tool selecting operation in the intervals between the machining steps for workpieces by various tools. The coupling motor 50 and the indexing motor 62 constitute second drive means in the present invention.

The above-described controlling system of the tool-slide drive controller 112 also functions as control means in the present invention, as described later, which controls the first and second drive means in such a manner as to prevent a relative movement between the spindle stock 12 and the turret 24, synchronously to the operation of the coupling drive controller 114.

The tool position detecting sensor 118 detects, on the basis of the coordinates of the current position of the tool slide 20, whether the turret-type tool rest 14 is placed at a position allowing a tool selection (i.e., a predetermined retreat position or a tool home position of the tool slide 20 where the turret 24 can perform the indexing rotation without interfering with the workpiece W or the spindle stock 12), in the case where the turret-type tool rest 14 is required to be placed at such position in connection with the indexing rotation step of the turret 24.

The coupling sensor 120 monitors the engagement/ disengagement operation of the coupling elements 66, 68 of the coupling unit 70, and detects the 1s fact that the coupling elements 66, 68 are completely engaged with each other, In particular, when the mutual engagement of the coupling elements 66, 68 is completed, it detects the fact that the torque of the coupling motor 50 increases, and thus outputs a coupling completion signal to the CPU 100.

The clutch sensor 122 monitors the engagement/ disengagement operation of the clutch pieces 72, 74 of the clutch unit 76, and detects the fact that the clutch pieces 72, 74 are completely engaged with each other. In particular, when the mutual engagement of the clutch pieces 72, 74 is completed, it detects the fact that the torque of the coupling motor 50 increases, and thus outputs a clutch completion signal to the CPU 100, The index sensor 124 monitors the rotational angle of the indexing rotation of the turret 24 and, when the rotationally indexing operation to the commanded angle is completed, outputs an index completion signal to the CPU 100.

As described above, in the control system shown in FIG. 7, a sensing structure which detects the rotational position or the torque fluctuation of a servo motor and outputs a signal is adopted for each of the tool position detecting sensor 118, the coupling sensor 120, the clutch sensor 122 and the index sensor 124, and, therefore, a known position-detecting sensor having an independent structure is not provided. However, such a position-detecting sensor can of course be adopted and, in this case, the sensors other than the index sensor 124 can be omitted. If the safety of the operation of the automatically operated lathe should be considered, it is, however, preferred that all of the sensors are provided.

Figure 8:
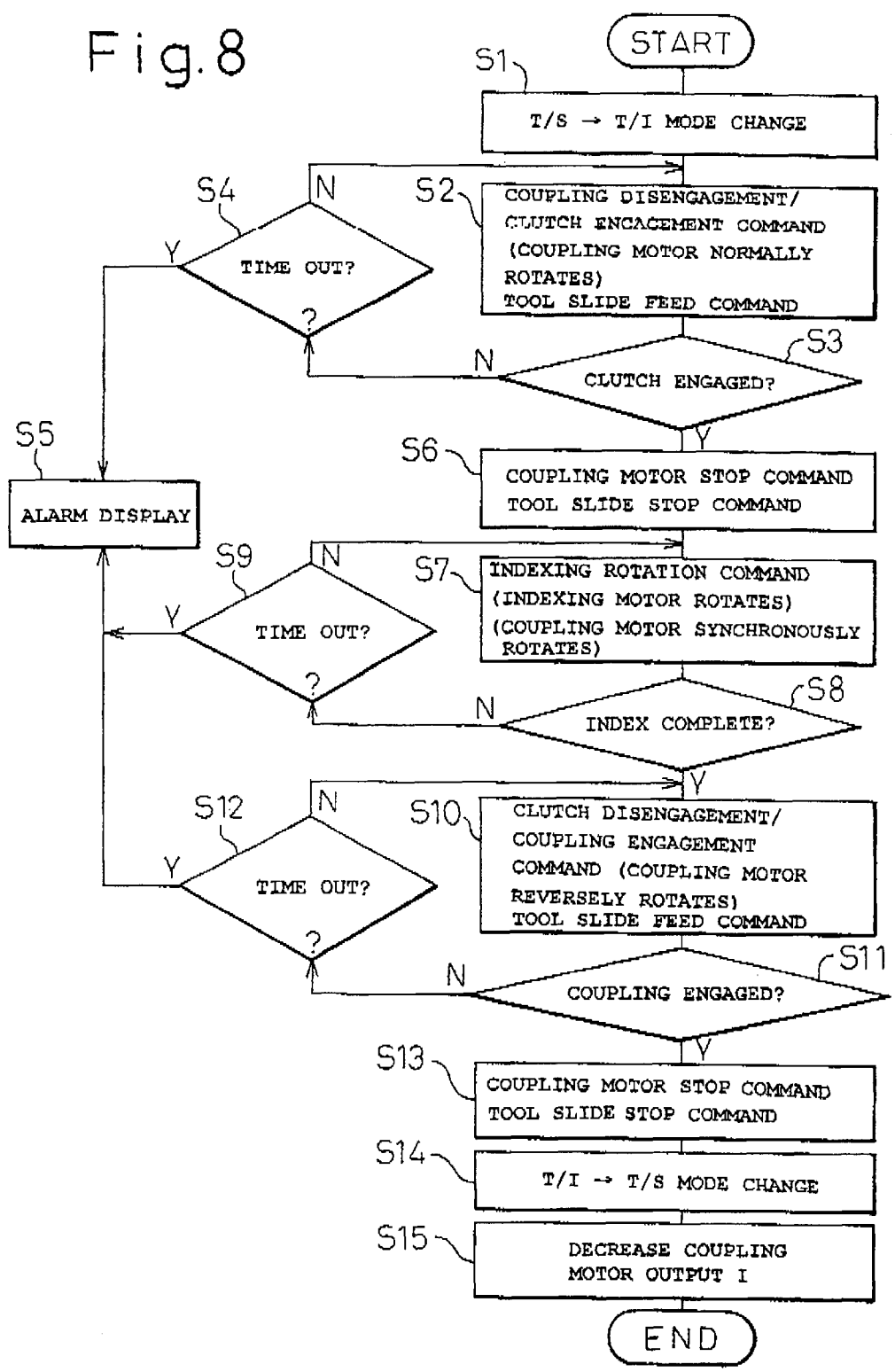
FIG. 8 is a flow chart showing the control actions of the tool slide and the turret-type tool rest by the control system shown in FIG. 7.

FIG. 8 shows, in a flow chart, a control action for carrying out the indexing rotation and the fixed locating of the turret 24 as well as the rotational driving of the rotary tool 34 by the control system of FIG. 7 in the embodiment shown in FIGS. 1 to 6. This control action is carried out mainly on the basis of the command of the CPU 100. Accordingly, the command of the CPU 100 will be mainly described below as the description of the control action.

The indexing motor 62 is a drive source for carrying out the indexing rotational driving of the turret 24 and the high-speed rotational driving of the rotary tool 34. The rotation speed and the rotation direction of the indexing motor 62 are changed in accordance with the selection of either of the turret 24 and the rotary tool 34 as a driven part, so that the control of the indexing motor 62 is divided into a mode for the indexing rotation of the turret 24 (T/I mode) and a mode for the high-speed rotation of the rotary tool 34 (T/S mode), and that the control programs corresponding to the respective modes are stored in the ROM/RAM 102.

First, when a machining step by a certain tool has been finished and the rotational indexing operation of the turret 24 is thereafter carried out to select a next tool, the control program of the indexing motor 62 is changed into the T/I mode after confirming that the machining step has been finished (S1).

Next, an operating command is sent to the coupling drive controller 114, so as to actuate the coupling motor 50 to rotate in a normal direction (S2). In this embodiment, such a rotation direction of the coupling motor 50 as to shift the nut 52 of the feed screw mechanism 54 axially frontward (leftward along a Z-axis in FIG. 2A) is defined as "a normal direction".

Figure 2:
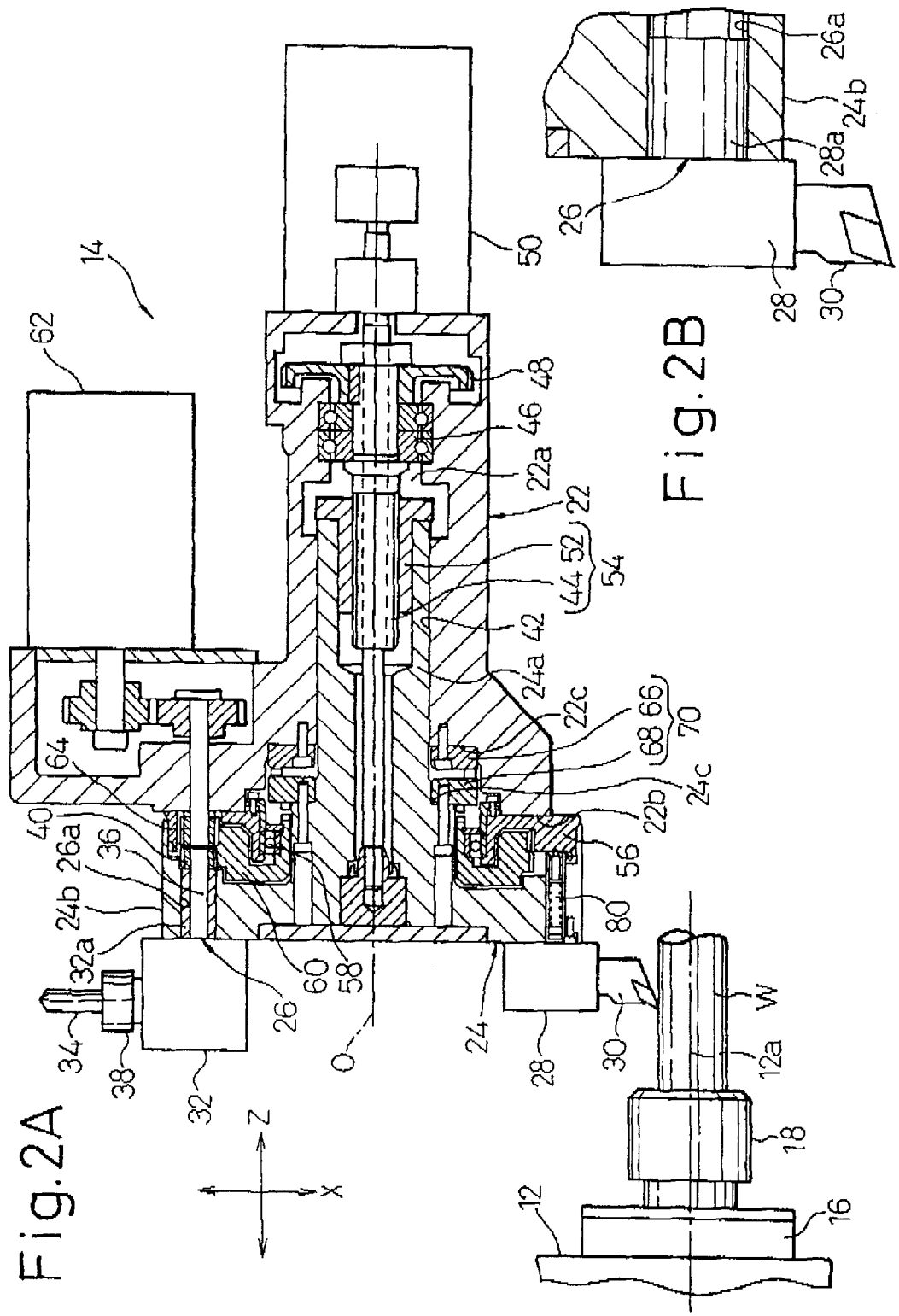
FIG. 2A is a sectional plan view showing a turret-type tool rest in the automatically operated lathe of FIG. 1.
FIG. 2B is an enlarged partial sectional view showing, in a different section, one tool-attachment portion of the turret-type tool rest of FIG. 2A.

The rotational driving force of the coupling motor 50 in the normal direction is transmitted to the ball screw 44 of the feed screw mechanism 54 through the power transmission gear 48 shown in FIG. 2, and thereby the ball screw 44 normally rotates. Accompanying the normal rotation of the ball screw 44, the nut 52 is linearly shifted frontward along the rotation axis O (leftward along the Z-axis). Simultaneously, the turret 24 secured to the nut 52 is also linearly shifted axially frontward (leftward along the Z-axis) together with the nut 52 relative to the tool rest body 22. As a result, the coupling unit 70 performs the unclamp action, and the turret 24 is permitted to be rotationally indexed.

In this process, however, if the tool attached to the turret 24 is left in the operative position, the turret 24 and the tool (the cutting tool 30 in FIG. 2A) are linearly shifted leftward along the Z-axis relative to the spindle stock 12 and the workpiece W, which results in the possibility of mutual interference. The present invention solves the problem of the mutual interference by carrying out the control as described below, instead of translating the turret-type tool rest 14 to the retreat position as already described.

The CPU 100 sends a controlling command to the tool-slide drive controller 112 simultaneously to sending the operating command to the coupling drive controller 114, so as to actuate the Z-axis feed motor 128 under a predetermined control. That is, according to this control, the Z-axis feed motor 128 acts, synchronously to the linear movement of the nut 52 by the coupling motor 50 (i.e., the leftward movement of the turret 24 along the Z-axis on the tool rest body 22 in FIG. 2A), to move the tool slide 20 along the Z-axis on the lathe base 10 in the opposite direction (rightward in FIG. 2A), i.e., a direction away from the spindle stock 12, by a moving distance equal to the linearly moving distance of the nut 52 and the turret 24 (S2). It should be noted that the "synchronization" in this control flow requires both conditions where the timing is identical as well as where the speed and the acceleration/deceleration are identical.

Accompanying the movement of the tool slide 20, the tool rest body 22 fixedly supported on the tool slide 20 is also moved in the direction away from the spindle stock 12 along the Z-axis on the lathe base 10. As a result, the turret 24 and the tool (e.g., the cutting tool 30) do not move in the rectangular three-axis coordinate system given on the lathe base 10, and thereby the relative linear movement between the spindle stock 12 and workpiece W and the turret 24 and tool is eliminated. In this manner, even when the above-described unclamp action is performed, the mutual interference between the spindle stock 12 and workpiece W and the turret 24 and tool is surely prevented.

Due to the relative movement between the turret 24 and the tool rest body 22 along the Z-axis, the coupling elements 66, 68 of the coupling unit 70 provided between the tool rest body 22 and the turret 24 are disengaged from each other, and thereby the turret 24 is permitted to freely rotate, In this step, the turret 24 is linearly moved leftward in the drawing along the Z-axis while the rotation is suppressed by the above-described rotation suppressing means.

When the normal rotation of the coupling motor 50 is further continued, the clutch pieces 72, 74 of the clutch unit 76 provided on the turret-type tool rest 14 are fully engaged with each other, and thereby the turret 24 is set in the completely unclamped position shown in FIG. 4. When the engagement between the clutch pieces 72, 74 is completed in this way, the load to the coupling motor 50 is rapidly increased, whereby the clutch sensor 122 outputs the clutch completion signal (S3).

The CPU 100 is provided with a timer function, and measures a time having elapsed from a point when the operating command is sent to the coupling drive controller 114 (S4). In the case where the clutch completion signal is not entered even when the predetermined time has elapsed, the malfunction of the system is decided, so that the operation of the coupling motor 50 and the Z-axis feed motor 128 is suspended, and that an alarm is displayed (S5).

On the other hand, in the case where the clutch completion signal is entered within the predetermined time, the rotational drive by the coupling motor 50 is stopped, so that the movement of the turret 24 in the Z-axis direction is finished. Simultaneously, the feed drive by the Z-axis feed motor 128 is stopped, so that the movement of the tool slide 20 in the opposite direction along the Z-axis is also finished (S6).

Then, the operating command is sent to the index drive controller 116 (S7), so as to operate the output shaft of the indexing motor 62 to rotate in the direction and angle of rotation which is determined by the positional relationship between a tool-attachment portion 26 on the turret 24 for a tool situated in the operative position after the machining step is finished and a tool-attachment portion 26 for a next selected tool. The rotational driving force of the indexing motor 62 is transmitted to the turret 24 through the gear train 77, the annular gear 60 and the clutch pieces 72, 74 of the clutch unit 76. The turret 24 performs the indexing rotation by this rotational driving force to shift the next selected tool into the operative position.

In this process, when the turret 24 rotates in an indexing manner by the rotational driving force of the indexing motor 62, the nut 52 of the feed screw mechanism 54 secured to the turret 24 also simultaneously rotates. When the relative rotation between the nut 52 and the ball screw 44 occurs, the ball screw 44 tends to linearly move along the rotation axis O. The ball screw 44 is, however, prevented from being moved along the rotation axis O by the antifriction bearing 46, so that the nut 52 is resultingly made linearly move along the rotation axis O together with the turret 24.

Further, according to this construction of the feed screw mechanism 54, in the case where the turret 24 is moved rightward in FIG. 4 while accompanying the indexing rotation, the rotating turret-side coupling element 68 interferes with the tool rest body-side coupling element 66, so that the indexing motor 62 becomes impossible to rotate. On the other hand, in the case where the turret 24 is moved leftward in FIG. 4 while accompanying the indexing rotation, the clutch piece 72, of the clutch unit 76 in a completely engaged state, is strongly thrust onto the clutch piece 74, so that the indexing motor 62 again becomes impossible to rotate.

Therefore, in this control flow, the output shaft of the coupling motor 50 is controlled to rotate in a predetermined rotation frequency and in a predetermined rotation direction, synchronously to the rotational output of the indexing motor 62 for rotating the turret 24 in the indexing manner, so as not to cause a relative movement between the ball screw 44 and nut 52 in the feed screw mechanism 54 during the indexing rotation of the turret 24.

In this connection, the rotation frequency ratio and rotation direction of the indexing motor 62 and the coupling motor 50 are determined on the basis of the gear ratio and rotation direction of a gear train between the indexing motor 62 and the annular gear 60 (or the turret 24) as well as of the gear ratio and rotation direction of a gear train between the coupling motor 50 and the ball screw 44. Accordingly, it is desired to store a control program structured in this way into the ROM/RAM 102.

When the indexing rotation of the turret 24 is finished in this manner, the index sensor 124 detects the rotating position of the indexing motor 62, to output the indexing completion signal (S8).

The CPU 100 measures a time having elapsed from a point when the operating command is sent to the indexing drive controller 116 (S9). In the case where the indexing completion signal is not entered even when the predetermined time has elapsed, a malfunction of the system is detected, so that the operation of the indexing motor 62 is suspended and an alarm is displayed (S5).

On the other hand, in the case where the indexing completion signal is entered within the predetermined time, the rotational drive by the indexing motor 62 is stopped. Then, an operating command is sent to the coupling drive controller 114, so as to actuate the coupling motor 50 to rotate in a reverse direction (S10).

The rotational driving force of the coupling motor 50 in the reverse direction is transmitted to the ball screw 44 of the feed screw mechanism 54 through the power transmission gear 48, and thereby the ball screw 44 reversely rotates. While accompanying the reverse rotation of the ball screw 44, the nut 52 and the turret 24 are linearly shifted axially rearward (rightward along the Z-axis in FIG. 2A) relative to the tool rest body 22. As a result, the clutch pieces 72, 74 of the clutch unit 76 are disengaged from each other, and the coupling elements 66, 68 of the coupling unit 70 are engaged with each other, so that the turret 24 is fixedly located in the indexed position.

Also, in this process, if the tool attached to the turret 24 is left in the operative position, the turret 24 and the tool (the cutting tool 30 in FIG. 2A) are linearly shifted rightward along the Z-axis relative to the spindle stock 12 and the workpiece W, which results in the possibility of mutual interference.

Then, the CPU 100 sends a controlling command to the tool-slide drive controller 112 simultaneously with sending the operating command of reverse rotation to the coupling drive controller 114, so as to actuate the Z-axis feed motor 128 under a predetermined control. That is, according to this control, the Z-axis feed motor 128 acts, synchronously with the linear movement of the nut 52 by the coupling motor 50 (i.e., the rightward movement of the turret 24 along the Z-axis on the tool rest body 22 in FIG. 2A), to move the tool slide 20 along the Z-axis on the lathe base 10 in the opposite direction (leftward in FIG. 2A), i.e., a direction toward the spindle stock 12, by a moving distance equal to the linearly moving distance of the nut 52 and the turret 24 (S10).

Accompanying the movement of the tool slide 20, the tool rest body 22 fixedly supported on the tool slide 20 is also moved in the direction toward the spindle stock 12 along the Z-axis on the lathe base 10. As a result, the turret 24 and the tool (e.g., the cutting tool 30) do not move in the rectangular three-axis coordinate system given on the lathe base 10, and thereby the relative linear movement between the spindle stock 12 and workpiece W and the turret 24 and tool is eliminated. In this manner, even when the above-described clamp action is performed, the mutual interference between the spindle stock 12 and workpiece W and the turret 24 and tool is surely prevented.

Due to the relative movement between the turret 24 and the tool rest body 22 along the Z-axis, the clutch pieces 72, 74 of the clutch unit 76 are disengaged from each other. In this step, the turret 24 is linearly moved rightward in the drawing along the Z-axis while the rotation is suppressed by the above-described rotation suppressing means.

When the reverse rotation of the coupling motor 50 is further continued, the coupling elements 66, 68 of the coupling unit 70 are fully engaged with each other, and thereby the turret 24 is set in the completely clamped position shown in FIG. 3. When the engagement between the coupling elements 66, 68 is completed in this way, the load to the coupling motor 50 is rapidly increased, whereby the coupling sensor 120 outputs the coupling completion signal (S11).

The CPU 100 measures a time having elapsed from a point when the operating command of reverse rotation is sent to the coupling drive controller 114 (S12). In the case where the coupling completion signal is not entered even when the predetermined time has elapsed, a malfunction of the system is detected, so that the operation of the coupling motor 50 and the Z-axis feed motor 128 is suspended, and an alarm is displayed (S5).

On the other hand, in the case where the coupling completion signal is entered within the predetermined time, the rotational drive by the coupling motor 50 is stopped, so that the movement of the turret 24 in the Z-axis direction is finished. Simultaneously, the feed drive by the Z-axis feed motor 128 is stopped, so that the movement of the tool slide 20 in the opposite direction along the Z-axis is also finished (S13).

In this manner, the selection of the next tool is completed.

Next, the control mode of the indexing motor 62 is changed into the rotational driving mode (T/S mode) for the rotary tool 34 (S14), and the output torque of the coupling motor 50 is decreased (S15).

In this step, the output torque of the coupling motor 50 acts as a pressing force between the coupling elements 66, 68 of the coupling unit 70 through the feed screw mechanism 54, so as to keep a condition where the coupling elements 66, 68 are mutually engaged. Therefore, it is possible to decrease the output torque of the coupling motor 50 to a torque (a keep torque) substantially sufficient to keep the interengagement of the coupling elements 66, 68.

In the above embodiment, the coupling unit 70 is formed by a so-called CURVIC coupling and the turret 24 is linearly moved through the feed screw mechanism 54, so that the keep torque can be significantly decreased.

According to the above control flow, an operational sequence for the tool indexing operation is finished. Thereafter, the machining process is carried out.

Even when the rotational indexing operation of the turret 24 is performed in accordance with the above-described control flow, it is possible that an interference may be caused between the tool and the workpiece during the indexing rotation of the turret 24, if the control mode for the indexing motor 62 is changed into the T/I mode immediately from the condition where the tip of the tool is in contact with the workpiece. In this case, a step for confirming whether the turret-type tool rest 14 is placed at the above-described retreat position, on the basis of the detecting signal from the tool home position detecting sensor 118, may be introduced after step S1 in the above-described control flow.

If the turret-type tool rest 14 is not placed at the above-described retreat position, a controlling command is sent to the tool-slide drive controller 112, so as to shift the tool slide 20 supporting the turret-type tool rest 14 in the X-axis direction in FIG. 1 to locate it at the predetermined retreat position. Then, after confirming that the turret-type tool rest 14 is placed at the retreat position, the coupling motor 50 is actuated to rotate in the normal direction in the above-described step S2.

Such a retreat movement in the X-axis direction is caused by the X-axis feed motor 130 shown in FIG. 7, while the above-described movement of the tool slide 20 synchronous to the rotation of the coupling motor 50 is caused by the Z-axis feed motor 128 shown in FIG. 7, so that it is possible to simultaneously perform the control of these motors 128, 130 through the tool-slide drive controller 112. That is, the tool slide 20 can be moved along the Z-axis in the opposite direction relative to the turret 24 while the turret-type tool rest 14 performs the retreat movement.

Further, even when the above-described retreating step is added, it is effective that a user is allowed to omit the retreat movement in the X-axis direction by a machining program, if the next selected tool is of the same type as the former tool.

Figure 9:
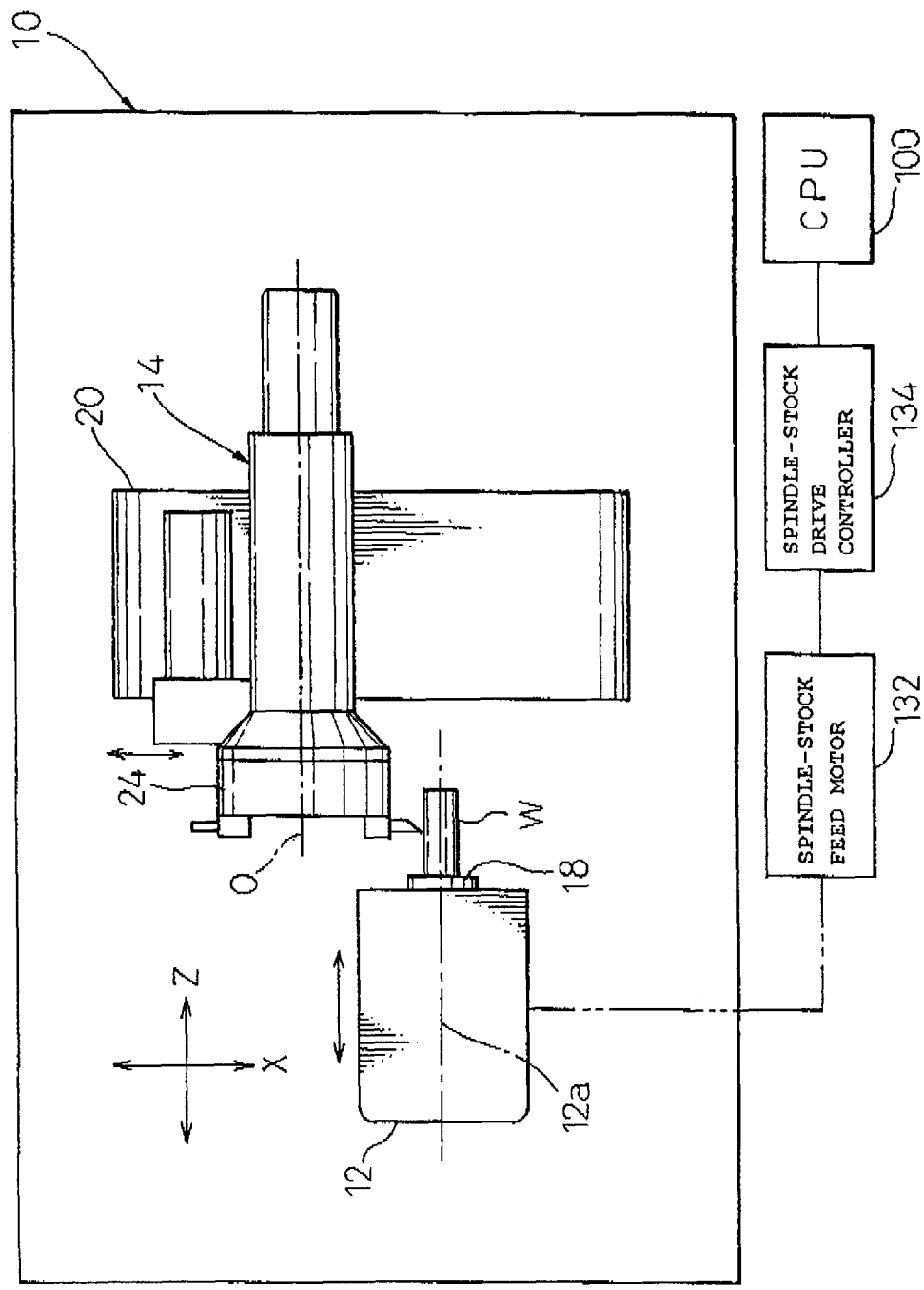
FIG. 9 is a schematic plan view showing the outside configuration of another embodiment of an automatically operated lathe according to the present invention.

FIG. 9 shows, in a schematic plan view, an automatically operated lathe according to another embodiment of the present invention. As illustrated, this embodiment has a constitution wherein the spindle stock 12 is translated in the Z-axis direction and the tool slide 20 is translated in the X-axis direction on the lathe base 10.

In this arrangement, the spindle stock 12 is driven by a spindle-stock feed motor 132 to move in the Z-axis direction, so as to shift the workpiece W along the axis 12a. The spindle-stock feed motor 132 is controlled by a spindle-stock drive controller 134. The spindle-stock drive controller 134 controls the spindle-stock feed motor 132 in accordance with the command of the CPU 100 (see FIG. 7).

Such a controlling system for the spindle-stock feed motor 132 also functions as control means in the present invention, which eliminates a relative movement between the turret 24 and the spindle stock 12, synchronously with the coupling drive controller 114.

That is, the CPU 100 sends a controlling command to the spindle-stock drive controller 134 simultaneously to sending the operating command to the coupling drive controller 114, so as to actuate the spindle-stock feed motor 132. The spindle-stock feed motor 132 thus acts, synchronously with the linear movement of the nut 52 by the coupling motor 50 as described in relation to the embodiment of FIG. 1, to move the spindle stock 12 along the Z-axis on the lathe base 10 in the same direction, by a moving distance equal to the linearly moving distance of the nut 52 and the turret 24.

As a result, in the rectangular three-axis coordinate system given on the lathe base 10, the relative linear movement between the spindle stock 12 and workpiece W and the turret 24 and tool is eliminated. In this manner, when the clamp and unclamp actions as described in the embodiment of FIG. 1 are performed, the mutual interference between the spindle stock 12 and workpiece W and the turret 24 and tool is surely prevented.

Figure 10:
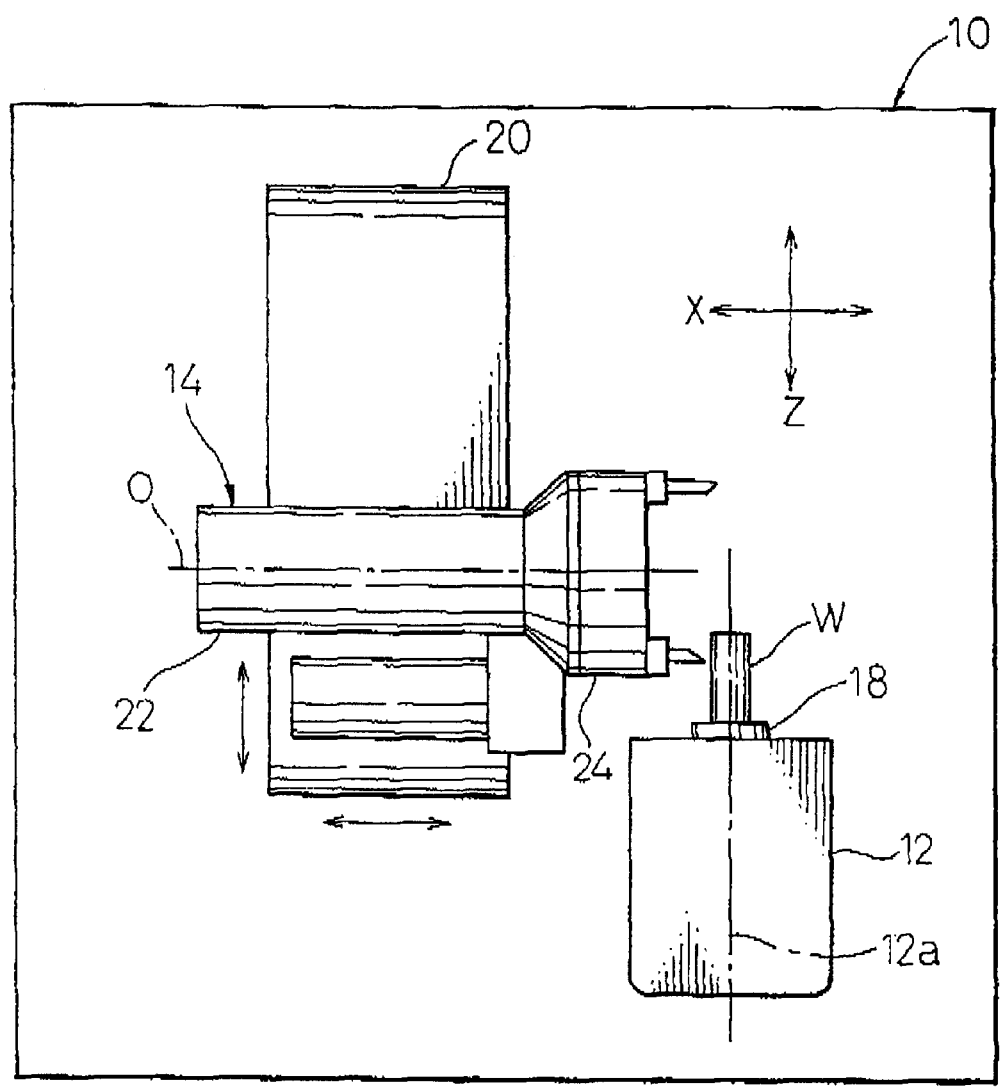
FIG. 10 is a schematic plan view showing the outside configuration of further embodiment of an automatically operated lathe according to the present invention.

FIG. 10 shows, in a schematic plan view, an automatically operated lathe according to further embodiment of the present invention. As illustrated, this embodiment is the same as the embodiment of FIG. 1 on the point that the tool slide 20 is translated in the X-axis and Z-axis directions on the lathe base 10, but is different therefrom on the point that the turret-type tool rest 14 is so arranged that the rotation axis O of the turret 24 thereof is orthogonal to the axis 12a of the spindle stock 12.

In this arrangement, the CPU 100 sends a controlling command to the tool-slide drive controller 112 simultaneously with sending the operating command to the coupling drive controller 114, so as to actuate the X-axis feed motor 130 (FIG. 7). The X-axis feed motor 130 thus acts, synchronously with the linear movement of the nut 52 by the coupling motor 50 as described in the embodiment of FIG. 1, to move the tool slide 20 along the X-axis on the lathe base 10 in the opposite direction, by a moving distance equal to the linear moving distance of the nut 52 and the turret 24.

Accompanying this movement, the tool rest body 22 fixedly supported on the tool slide 20 is also moved along the X-axis on the lathe base 10. As a result, the turret 24 and the tool do not move in the rectangular three-axis coordinate system given on the lathe base 10, and thereby the relative linear movement between the spindle stock 12 and workpiece W and the turret 24 and tool is eliminated. In this manner, when the clump and unclamp actions as described in the embodiment of FIG. 1 are performed, the mutual interference between the spindle stock 12 and workpiece W and the turret 24 and tool is surely prevented.

Industrial Applicability

The present invention can be applied to an automatically operated lathe having such a structure that a turret and a tool rest body are axially linearly moved relative to each other in order to set a coupling unit in a disengaged state before the turret is rotated in an indexing manner and to set the coupling unit in an engaged state after the indexing rotation, and thereby can eliminate the axial linear movement of the turret relative to a spindle stock and a workpiece when the turret is rotated in the indexing manner. As a result, it is possible to facilitate writing a machining program by a user, to surely prevent the interference between the turret or tool and the spindle stock or workpiece, and to reduce machining time.

What is claimed is:

1. An automatically operated lathe, comprising:

a lathe base;

a spindle stock placed on said lathe base;

a tool rest body placed on said lathe base;

a turret supported on said tool rest body, said turret being capable of performing an indexing rotation about a rotation axis on said tool rest body and a linear movement relative to said tool rest body along said rotation axis in an indexed position;

a pair of coupling elements provided between said tool rest body and said turret, said coupling elements being capable of being engaged with and disengaged from each other while accompanying said linear movement of said turret in said indexed position on said tool rest body;

first drive means for generating a relative movement between said spindle stock and said tool rest body on said lathe base;

second drive means for generating said indexing rotation and said linear movement between said tool rest body and said turret; and control means capable of controlling said first and second drive means in such a manner as to move said spindle stock and said tool rest body relative to each other, synchronously with said linear movement of said turret, so as to prevent a relative movement between said turret and said spindle stock from being caused due to said linear movement.

2. An automatically operated lathe as set forth in claim 1, wherein an axis included in said spindle stock is arranged in parallel to said rotation axis of said turret.

3. An automatically operated lathe as set forth in claim 2, wherein said first drive means acts to move said tool rest body in a first coordinate-axis direction parallel to said rotation axis of said turret and in a second coordinate-axis direction orthogonal to said first coordinate-axis direction.

4. An automatically operated lathe as set forth in claim 2, wherein said first drive means acts to move said spindle stock in a first coordinate-axis direction parallel to said rotation axis of said turret and to move said tool rest body in a second coordinate-axis direction orthogonal to said first coordinate-axis direction.

5. An automatically operated lathe as set forth in claim 1, wherein an axis included in said spindle stock is arranged orthogonally to said rotation axis of said turret.

6. An automatically operated lathe as set forth in claim 5, wherein said first drive means acts to move said tool rest body in a first coordinate-axis direction parallel to said rotation axis of said turret and in a second coordinate-axis direction orthogonal to said first coordinate-axis direction.

7. A method of controlling an automatically operated lathe which includes a lathe base; a spindle stock and a tool rest body, both being relatively movably placed on said lathe base; a turret supported on said tool rest body, said turret being capable of performing an indexing rotation about a rotation axis on said tool rest body and a linear movement along said rotation axis in an indexed position; and a pair of coupling elements provided between said tool rest body and said turret, said coupling elements being capable of being engaged with and disengaged from each other while accompanying with said linear movement of said turret in said indexed position on said tool rest body; said method comprising the steps of:

linearly moving said turret relative to said tool rest body along said rotation axis in said indexed position; and moving said spindle stock and said tool rest body relative to each other, synchronously with a linear movement of said turret, so as to prevent a relative movement between said turret and said spindle stock from being caused due to said linear movement.

* * * * *

UNITED STATES PATENT AND TRADEMARK OFFICE
CERTIFICATE OF CORRECTION

PATENT NO.   : 6,257,111 B1  
DATED        : July 10, 2001  
INVENTOR(S)  : Hiroshi Shinohara et al.

It is certified that error appears in the above-identified patent and that said Letters Patent is hereby corrected as shown below:

<u>Title page,</u>  
Item [30], insert -- Foreign Application Priority Data

August 29, 1997    (PCT)- - - - - - - - - - - - - PCT/JP97/03028 --

Signed and Sealed this

Ninth Day of July, 2002

*Attest:*

JAMES E. ROGAN  
*Attesting Officer*    *Director of the United States Patent and Trademark Office*